No. 756,846. PATENTED APR. 12, 1904.
A. GRAMMONT.
ELECTROGONIOMETER.
APPLICATION FILED JULY 10, 1902.
NO MODEL. 5 SHEETS—SHEET 2.

Fig. 2.

Witnesses
Gustave R. Thompson.
William B. Kerkam.

Inventor
Alexander Grammont
By Philip Mauro
Attorney

No. 756,846. PATENTED APR. 12, 1904.
A. GRAMMONT.
ELECTROGONIOMETER.
APPLICATION FILED JULY 10, 1902.
NO MODEL. 5 SHEETS—SHEET 3.

WITNESSES:
INVENTOR
Alexandre Grammont
BY
Philip Mauro
ATTORNEY.

No. 756,846. PATENTED APR. 12, 1904.
A. GRAMMONT.
ELECTROGONIOMETER.
APPLICATION FILED JULY 10, 1902.
NO MODEL. 5 SHEETS—SHEET 4.

FIG. 4.

WITNESSES:
INVENTOR
Alexandre Grammont
BY
ATTORNEY

No. 756,846. PATENTED APR. 12, 1904.
A. GRAMMONT.
ELECTROGONIOMETER.
APPLICATION FILED JULY 10, 1902.
NO MODEL. 5 SHEETS—SHEET 5.

WITNESSES:

INVENTOR
Alexandre Grammont
BY
ATTORNEY

No. 756,846. Patented April 12, 1904.

UNITED STATES PATENT OFFICE.

ALEXANDRE GRAMMONT, OF PONT DE CHERNY, FRANCE.

ELECTROGONIOMETER.

SPECIFICATION forming part of Letters Patent No. 756,846, dated April 12, 1904.

Application filed July 10, 1902. Serial No. 115,094. (No model.)

*To all whom it may concern:*

Be it known that I, ALEXANDRE GRAMMONT, engineer, a citizen of the Republic of France, and a resident of Pont de Cherny, Isère, in the Republic of France, have invented a new and useful Improvement in or Relating to Electrogoniometers, which invention is fully set forth in the following specification.

My invention relates to alternating-current measurements, and has for its object the production of apparatus and a system of connections by which the power factor of an alternating-current circuit may be directly and readily determined. Heretofore in attempts to produce direct-reading apparatus for this purpose more or less complicated systems or coils and other apparatus have been employed whose several actions and reactions have required careful adjustment and repeated calibrations to keep the percentage of error small. By my method not only do I simplify the apparatus, but I eliminate the necessity for preliminary adjustment, this adjustment, or in a sense calibration, being incidentally made *de novo* at each operation by which a reading is secured.

Broadly stated, my invention consists in combining the electromotive-force component and the current component in an alternating circuit to produce a resultant variable, then by suitable means modifying or changing the phase of one component with relation to the other until the resultant variable reaches a maximum or minimum value, and finally measuring the angle of relative phase displacement. In other words, assuming the electromotive force and the current in the circuit to follow the sinusoidal law, the power factor being expressed mathematically as proportional to the cosine of the angle of lag, I measure directly this angle of lag for any particular case.

More specifically stated, I arrange a local circuit in which the actual forces to be measured are propagated, the tension in this circuit at any instant being the algebraic sum of two induced forces, one due to the electromotive-force component of the main circuit (which may be conveniently localized by a transformer bridged across the alternator-terminals or the mains) and the other due to the current component of the main circuit, (and conveniently localized by a transformer whose primary is in series in the main circuit.) The electromotive-force waves induced in the local circuit are out of phase, a resultant curve being produced which varies with one or both of its components. By introducing inductive resistance in the respective supply branches or by modifying the action of the transformers, or either of them, I can increase or diminish the angle of phase displacement between the two forces, and thereby alter the value of their resultant according to the direction of the displacement. Thus by bringing the respective forces toward phase conjunction I can increase this resultant value toward a limit determined by their sum, and by bringing them toward opposition I can correspondingly reduce the resultant value toward zero. The limit in either direction will obviously be possible of attainment only when potentials are equalized, and the variations in resultant value are made entirely dependent on phase differences. In any case, however, the angle of phase displacement of the forces relatively to each other necessary to produce a maximum or a minimum resultant in the local circuit gives the desired information directly.

A feature of my system is that I am enabled to use ordinary measuring instruments, such as electrostatic voltmeters, and the only special apparatus is the phase modifier, unless conditions should call for special transformers.

Instead of using two or more transformers I may employ other means of localizing the forces desired to be compounded. Thus I may employ a Gramme ring with two, three, or more equidistant connections to the initial source of electromotive force and connect back the current-carrying mains through adjustable contacts, preferably, also, through a transformer, so that while a local circuit is in effect produced the initial electromotive force is directly propagated and not through transformation. The advantage of such an arrangement is that means can be adopted to directly equalize potentials, and the angular movement of the adjustable contacts, whereby the number of turns interposed between each fixed electromotive-force connection and its corresponding current-contact is regulated, directly indicates the angle of lag, and it is possible to use but a single voltmeter. Other similar means to attain the desired end will be pointed out in the following specification. I am aware that many such may be devised; but all are contemplated and included in the scope of this invention, whether described or not.

I consider my invention to reside, broadly, in the application of the principle I have enunciated to the purposes and in the manner above stated, the same being described hereinafter as embodied in apparatus which so far I have found the best, with some important possible modifications. Such description, therefore, is not to be taken as in any sense limiting, but only as explanatory and to render the invention immediately available to others.

Referring to the accompanying drawings, wherein my invention is illustrated in several forms.

Figure 2:
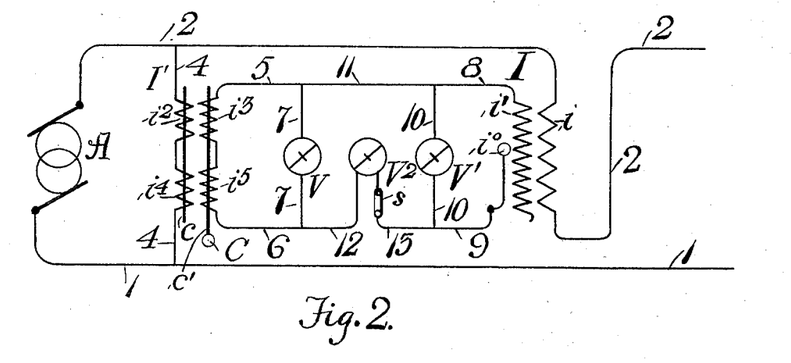
Fig. 2 is a simplified diagram showing the essential principles of the invention as applied to a single-phase system.

Referring now to Fig. 2, which shows the invention in its simplest form, A is an alternator supplying the mains 1 and 2. Bridged across the terminals of the machine or across the mains are the primary windings $i^2$ and $i^4$ of the transformer I'. This transformer has a double core, one portion, $c$, within the primary windings being fixed, the other portion, $c'$, being within the secondary windings and movable. For the purpose of moving this a handle C is provided. The secondary windings $i^3$ and $i^5$ are connected by wires 5, 6, and 7 to the voltmeter V. Included in series in the main 2 is the primary $i$ of a transformer I, whose secondary $i'$ is connected by wires 8, 9, and 10 to the voltmeter V'. The wires 5 and 8 are connected by a wire 11, and between the wires 6 and 9 a voltmeter $V^2$ is connected by wires 12 and 13. The potential difference across the terminals of the voltmeter V' due to the secondary winding $i'$ must be variable at will, and I have shown a contact $i^0$, movable over the convolutions of the coil to include more or less of the winding in the circuit 8 9 10, as may be required. The same result may be obtained and preferably is obtained by employing an adjustable rheostat from the coil itself. With this arrangement, which, it will be understood, is illustrative merely, there will obviously be induced electromotive forces in the circuit 5 6 7 and in the circuit 8 9 10, which will be out of phase with each other to a degree determined by the respective time-constants of the two coils I and I' and the circuits in which they are included. Assuming that we have a short circuit across the mains non-inductive in character, this phase difference having been determined may be taken as zero for my purpose. Now suppose that the contact $i^0$ is adjusted so that the voltmeters V and V' indicate the same difference of potential and suppose a load to be carried by the mains 1 2, the angle of phase displacement between the electromotive forces in the circuits 5 6 7 and 8 9 10 will be the same as the angle of lag between the current in the mains 1 2 and the electromotive force across the terminals of the machine. If desired, a switch $s$ may be inserted in the circuit of voltmeter $V^2$, and assuming this to be closed, as shown in the figure, the circuit 11 12 13 of the voltmeter $V^2$ will have impressed upon it electromotive forces due to both coils I and I'. The voltmeter $V^2$ will therefore indicate a potential difference equal to the algebraic sum or resultant of these forces. If the waves of the two component forces are brought into conjunction, this resultant will have a maximum value, and if they are brought into opposition the resultant will obviously be zero, reaching its minimum when the angle of lag is greatest.

By adjusting the core $c'$ of the coil I' the relative phase displacement may be adjusted, and by providing means to measure the displacement of the core required to make the reading of voltmeter $V^2$ zero the angle of lag of current in the mains may be directly measured.

Figure 1:
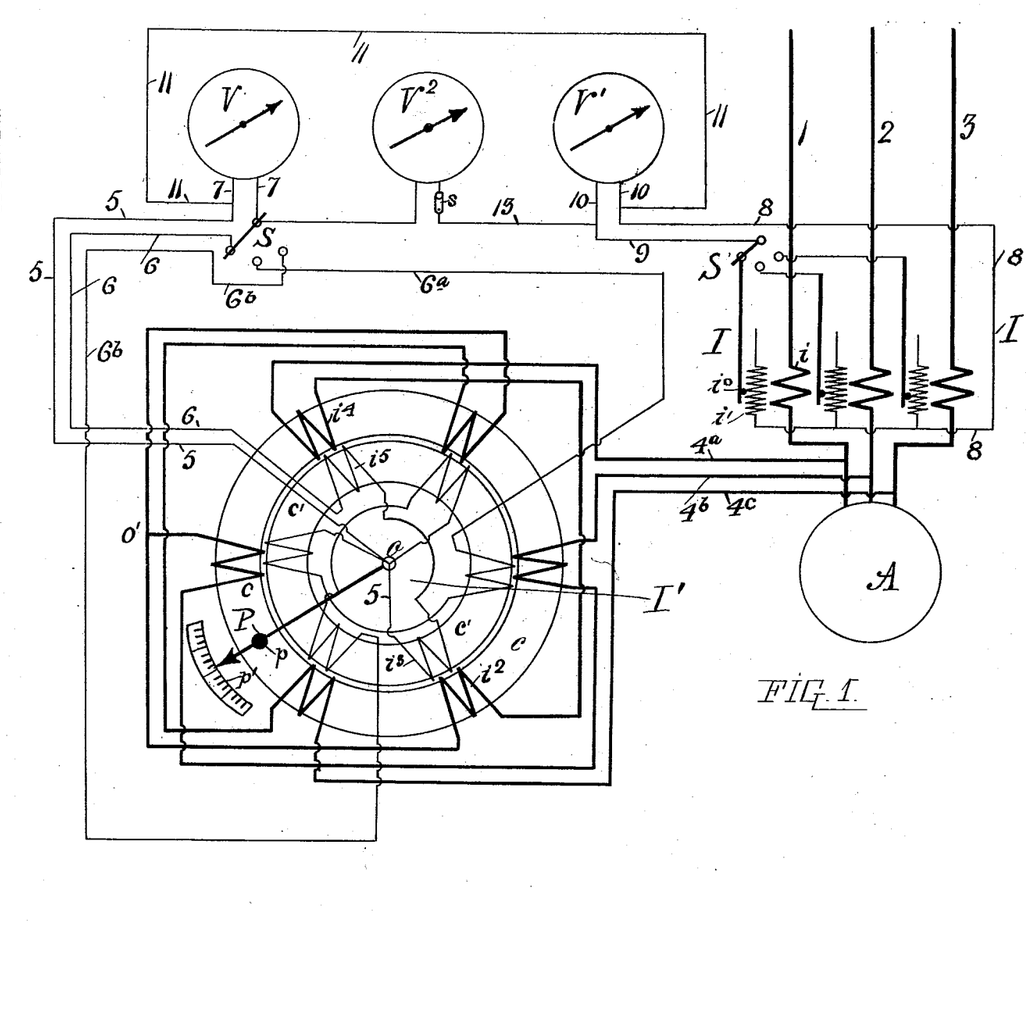
Figure 1 is a diagram of a three-phase system having my invention applied thereto and employing a transformer with a rotary core and secondary winding.

In Fig. 1 I have shown a rather more complete embodiment of the invention as applied to a three-phase system. Here again A is the alternator supplying the mains 1 2 3. Tapped off from these mains are the bridge or potential wires $4^a$, $4^b$, and $4^c$, corresponding to the bridge-wire 4 in Fig. 2. All the other parts and circuits throughout the case will likewise be found lettered to correspond with Fig. 2. The bridge-wires referred to pass to the coils $i^2$ $i^4$, &c., wound upon a ring-core $c$ in pairs oppositely and symmetrically with star connection, the center being figured at $o'$. The coils $i^2$ $i^4$ are connected from point $o'$ by wire $4^a$ to the main 1. The next pair of coils is connected from point $o'$ by wire $4^b$ to main 2 and the third pair from point $o'$ by wire $4^c$ to main 3. A rotary field is thus created for the transformer as the electromotive forces rise and fall successively in the pairs of coils. Within and concentric with the ring-core $c$ is mounted a movable ring-core $c'$, upon which are wound in pairs symmetrically the secondary coils $i^3$ $i^5$, &c., corresponding to the pairs of primary coils on the core $c$. These pairs of coils have also a common return having a star connection from point $o$, the common return 5 leading to the wire 7 and one side of voltmeter V. The first pair of coils $i^3 i^5$ is connected from point $o$ by wire 6 to one of the contacts of a switch S. The next pair of coils is connected from point $o$ by wire $6^a$ to the second contact of the switch S and the third pair of coils by wire $6^b$ to the third contact thereof. The arm of the switch S is connected through wire 7 to the opposite side of the voltmeter V from the common return connection 5. By means of this switch S any pair of secondary coils can be bridged across the terminals of voltmeter V. In the three mains are included the three primaries $i$ of the three-phase transformer I, a compensating contact $i^0$ being provided, as in Fig. 2, for each secondary winding $i'$. As the variations are symmetrical on the three mains, it is obviously necessary to work with one main only at any given time for the series or current component. I have shown a triple transformer I, the secondaries of which have a common return 8, leading from all the secondary windings to wire 10 and one side of the voltmeter V'. The three movable contacts $i^0$ are connected to the three contacts of a switch S', whose arm is connected by wire 9 to the other side of voltmeter V'. By setting the switch S' energy may be derived from any one of the three secondary windings. It thus appears that by setting the switch-arms of the two switches S and S' in corresponding positions corresponding pairs of coils of the primary and secondary windings of transformer I' may be included in the circuits 5 6 7 and 8 9 10, respectively, thus producing in any one case the conditions shown in Fig. 2. With the switch-arm in position shown in Fig. 1 the first pair of coils $i^3 i^5$ are connected with voltmeter V, while the first secondary of the transformer I is connected with voltmeter V'. The intermediate connections of voltmeter $V^2$ and the circuit 11 12 13 are the same as in Fig. 2. The operation is also the same after the switches S and S' are once set; but brief notice will be taken of the action of the transformer I'. The movable core $c'$ is provided with means to turn it—as, for example, an arm P, having a handle $p$ and carrying a pointer passing over a graduated arc $p'$. Now supposing the coils and connections, as well as the magnetic parts, to be so designed that when the coils $i^3$ and $i^5$ are radially opposite coils $i^2$ and $i^4$ the electromotive forces will either be in phase or will have an angular displacement which can be taken as zero for my purposes. Obviously any rotation of the ring $c'$, displacing the coils relative to each other, will produce a corresponding relative phase displacement, and, as has already been pointed out in connection with Fig. 2, when this displacement is maximum or minimum, as indicated by the resultant value at $V^2$, the angle of current lag in the mains or the desired power factor may be directly indicated upon the scale $p'$.

To indicate the operation of this apparatus in other terms, we will start with the assumption that the radius vectors of the electromotive forces at the secondary terminals of the transformer I are displaced ninety degrees. The radius vectors representing the electromotive force at the secondary terminals of transformer I' are in phase with the electromotive force at the terminals of the alternator when the windings of core $c'$ are directly opposite corresponding windings of $c$. Suppose it is desired to determine current lag through an angle in the main 1. The contact $i^0$ is adjusted so that voltmeters V and V' give the same reading. Now assuming that $\zeta$ indicates the angle through which $c'$ must be turned to cause the resultant electromotive force to reach zero, then $\zeta_1 = \Phi - 90°$. The angle $\zeta$ can then be read off on the scale. As before stated, the voltmeters V and V' need not be set to equality; but the arm P may be turned to find the position giving maximum or minimum indications on $V^2$.

Figure 3:
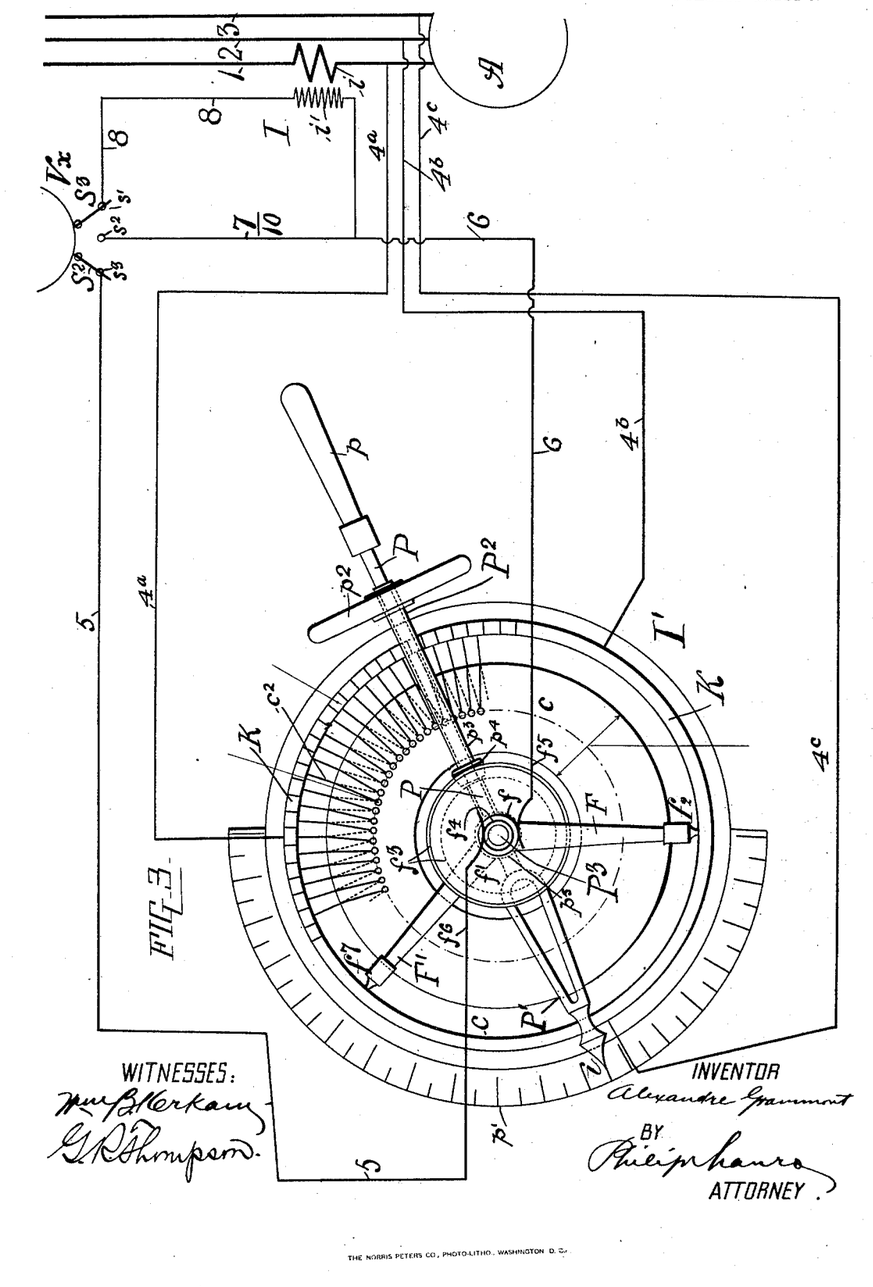
Fig. 3 is a diagram showing a three-phase system with my invention applied thereto and employing a phase-modifier with a single Gramme-ring winding.

Referring now to Fig. 3, I have therein indicated a means of effecting a composition of forces with only a single fixed coil in the phase-modifier, reducing the latter to a very simple piece of apparatus. In this figure, as before, A is the alternator, supplying the mains 1 2 3. Potential-wires $4^a$, $4^b$, and $4^c$ are taken off and carried to three points one hundred and twenty degrees apart on a commutator K, to whose segments are connected the terminals of a considerable number of coils constituting the windings $c^2$ of a fixed core $c$. This commutator is internally faced and centrally journaled, so as to turn within, and upon it are the contact-arms F and F', carrying the terminal contacts $f^2$ and $f^1$, respectively. The arm F is carried on a hub $f$, rigidly connected with an overlying bevel-gear or friction-disk $f'$, while the arm F' is carried on a similar hub $f^4$, passing down and through a disk $f^3$, whose bevel is indicated in dotted lines. Lying between these two disks is a sleeve $p^5$, which surrounds the inner hub or sleeve $f^4$ and turns thereon, while within the hub $f^4$ is the central spindle $P^3$, which is fixed to the frame of the machine and centered therein. The entire arrangement is similar to that of the hour and minute hands and gears of a clock, the two arms F and F' being capable of independent movement and when locked together, as will be described, being rotatable as a unit structure. Rigidly secured to the sleeve $p^5$ on one side is the arm P, projecting to the right in the figure and having a handle $p$, and rigidly secured on the left of the sleeve as a diametral extension of this arm is the pointer P', which moves over the graduated arc $p'$. Upon the arm P is carried a sleeve $p^3$, having at its inner extremity a beveled or plain friction gear or disk $p^4$, touching both the disks $f'$ and $f^3$, one above and the other below the arm P, so that if the friction-disk $p^4$ is turned it will revolve the other two disks in opposite directions to move the arms F and F' relatively to each other. Upon the outer end of the sleeve $p^3$ is rigidly secured a hand-wheel $p^2$, by which the sleeve and the disk $p^4$ may be turned upon the arm P. The hubs $f$ and $f^4$, with their connected parts and the arms F F', are insulated from each other. A brush $f^5$ rests upon the hub $f$, and a brush $f^6$ rests upon a hub $f^4$, the first brush being connected by wire 6 and wire 9 to the secondary winding $i'$ of the transformer I, the other side of which is connected by wire 8 to one of three contacts of the voltmeter $V^\times$. The wire 9 (and hence also wire 6) is connected by the wire marked 7\10 to a second contact at the voltmeter, for a purpose presently to be described. The second brush $f^6$ is connected by wire 5 to the third contact of the voltmeter. The three voltmeter-contacts are marked $s'$, $s^2$, and $s^3$, respectively.

As previously stated, it is sufficient to take the current in any one of the three mains for purposes of composition. So in this figure and in this arrangement I use but the one coil I, while the ring-winding $C^2$ is symmetrically connected to the three mains to preserve the symmetry of the rotating field. A striking point is the use of but a single voltmeter, and inasmuch as I desire to equalize the potentials, as in Fig. 2, I provide the switches $S^2$ and $S^3$, whereby I may connect the voltmeter one way or the other, as well as both ways, in the following manner: Assume the alternator to be working and a load upon the mains. It being desired to determine the power factor, leaving switch $S^3$ in the position shown I first move the switch $S^2$ over to contact $s^2$. This connects the voltmeter $V^\times$ in the circuit 8, 9, and 7\10 with the coil $i'$. Then returning the switch $S^2$ to the contact $s^3$ and moving the switch $S^3$ to the contact $s^2$ I have the voltmeter connected in the circuit 5 6 7\10, enabling me to ascertain the pressure in this circuit. If we take the pressure in circuit 8 9 7\10 as the standard, I may regulate that in the other circuit to correspond by turning the hand-wheel $p^2$ in one direction or the other, thereby moving the arms F and F' nearer together or farther apart, as the case may require. It will be apparent that whatever the position of both arms may be with regard to the three-phase connection their difference of potential is due to the number of turns included between them, and hence their distance apart.

I wish to state here that the wiring and connections in all the figures of my drawings have the same or corresponding parts marked with the same letters or figures of reference, so that the different figures may be compared conveniently. Hence the marking 7\10, inasmuch as this wire corresponds to both wires 7 and 10 in Figs. 1 and 2. Having thus adjusted for equipotentials, I move the switches $S^2$ and $S^3$ to the positions shown in Fig. 3, and the voltmeter thus becomes connected on the one side with the coil $i'$ and on the other side by wire 5 to the phase-modifier. The complete circuit is as follows: switch $S^3$, wire 8, coil $i'$, wire 9, wire 6, brush $f^5$, hub $f$, arm F, contact $f^2$, commutator K, winding $c^2$ to contact $f^7$, arm F', hub $f^4$, brush $f^6$, wire 5, and switch $S^2$. In this circuit we have a resultant electromotive force due to the induced electromotive force in phase with the current in the main 1 and to the electromotive forces directly propagated through the potential or bridge wires $4^a$, $4^b$, and $4^c$. The potentials being the same, the voltmeter $V^\times$ will indicate a resultant pressure which will vary with the phase difference between these electromotive forces. Now by moving the handle $p$ I can move both arms F and F' together, and as these arms approach to or recede from the points of connection of the potential wires a position will be found in which the component electromotive forces are nearly or exactly in opposition, when the voltmeter will indicate a zero potential difference between its terminals. The angular displacement necessary to affect the required phase displacement is indicated by the pointer P', and the instrument is so calibrated as to read power factor directly.

The method of reduction to zero permits any type of instument to be used for measuring the electromotive force. I preferably employ electrostatic volmeters; but these could be replaced by hot-wire voltmeters, if desired. A single winding or a single pair of windings on the core $c'$ might be used, corresponding to one phase. The indications would then be as follows:

$$\zeta_1 = \Phi\ 90°,$$
$$\zeta_2 = \Phi - 90° - 120°,$$
$$\zeta_3 = \Phi - 90° - 2 \times 120°.$$

Figure 4:
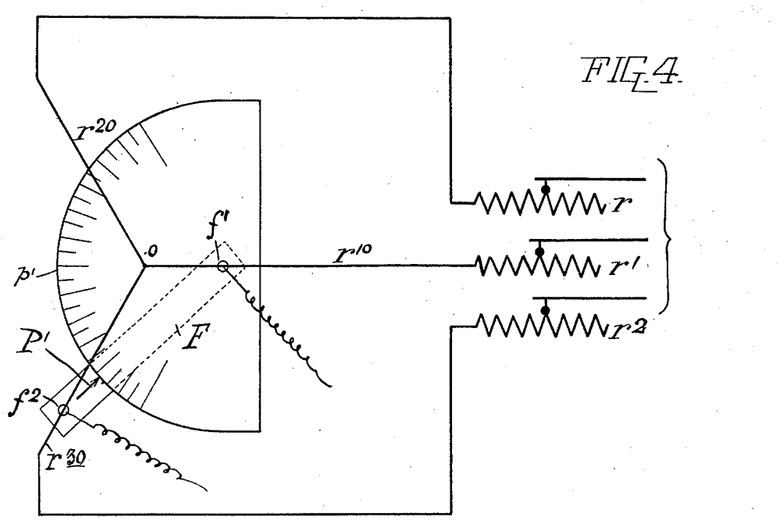
Fig. 4 is a diagram showing in a still simpler form a phase-modifier for use in a three-phase system, such as that shown in Fig. 3.

As a simplification of my system I may use an elementary phase-modifier without the arrangements of Figs. 1 and 3. This is shown in Fig. 4, wherein the non-inductive resistances $r$, $r'$, and $r^2$ are supposed to be connected to the three mains 1, 2, and 3. Extensions of the three resistances are carried to the point $o$ and arranged symmetrically at angles one hundred and twenty degrees apart, as indicated at $r^{10}$, $r^{20}$, and $r^{30}$. A bar of insulation F carries contacts $f'$ and $f^2$, which slide along the resistances $r^{10}$, $r^{20}$, and $r^{30}$ and $r^{20}$, being adjustable between any two of them. The bar is pivoted at $f'$ to a graduated disk $p'$, and as it turns about said disk the latter moves and travels along the resistances. The connections and the movements of the bar F are the same as heretofore described, and the readings are made on the disk $p'$ by means of the pointer P'. For any given pair of mains a definite position of the bar F will exist for each lag-angle $\zeta_1$, &c. By moving the bar the phase variations and balance are obtained.

In order to equalize the electromotive forces indicated at V and V', it is possible to substitute for the previous arrangements two sliding contacts, operating along three non-inductive resistance-rods in star connection from a common point or axis to the three terminals of the transformer I' in Fig. 1. In such case the sliding contacts of secondary coil of the transformer I would not need to be used.

In case non-inductive resistances be substituted for the transformer-coils I it is apparent that the electromotive force in the local circuit would be in phase and not in quadrature with the current or $\zeta_1 = \zeta$. If desired, a small step-up transformer may be branched onto the terminals of this non-inductive resistance.

In using my invention with monophase systems the arrangements remain the same; but in order to obtain a rotating field any of the well-known means may be employed, such as a self-starting monophase motor either running a three-phase generator or having its windings suitably tapped.

As I have stated, in such an arrangement as that in Fig. 3 it is necessary to use only one transformer I instead of the triple transformer, inasmuch as the variations in the three mains are alike, and for the same reasons it is unnecessary to employ a third arm symmetrical with the arms F and F'.

The Y or star form of resistances shown in Fig. 4 in spite of its apparent simplicity is not adapted for practical use. The form of apparatus shown in Fig. 3, where the contacts are moved in a circle, is obviously the most practical, all angles reading directly and all parts having a fixed and common center. $o$–1, $o$–2, and $o$–3 are the three resistances, the angle being equal to one hundred and twenty degrees. It is desirable that contacts 4 and 5 should be capable of displacement by a single operation, as in the case of contacts $f^2$ and $f^1$ of Fig. 3, that the angle should read directly upon a graduated member. I realize these three desiderata by devising a variation of Fig. 3, wherein a convenient shifting of the resistance 4–5 lengthwise may be made. In practice the three resistances would be formed of three spirals of wire of uniform diameter, over which the contacts will travel.

Figure 5:
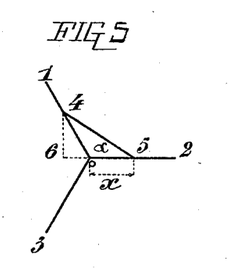
Figs. 5, 6, 7, and 8 are diagrams illustrative of the development of the idea embodied in Fig. 4.

Now in Fig. 5, assuming $x$ as the distance from 0 to 5, $r$ equals $k^x$ is the expression for the resistance of the branch reckoned from the neutral point. If $\propto$ be the angle $o$–5–4 and 1 the length from 4 to 5, we have—

$$l \cos. \propto = (6 - o) + x$$

or $$(6 - o) = b \sin. \propto \tan. 30° - l \sin. \propto \frac{l}{V_3}$$

or substituting $$l \cos. \propto = l \sin. \propto \frac{l}{V_3} + x$$

$$x = l \left( \cos. \propto - \frac{\sin. \propto}{V_3} \right)$$

and $$r = kx = kl \left( \cos. \propto - \sin. \frac{l}{V_3} \right)$$

The limiting curve for the cylinder on which the spiral should be wound is expressed in the equation $$\frac{dr}{dl} = kl \left( - \sin. \propto - \frac{\cos. x}{V_3} \right)$$

Figure 6:
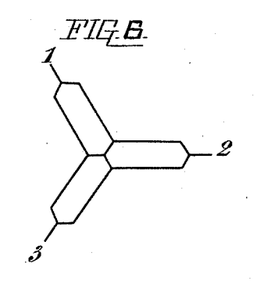
Figure 7:
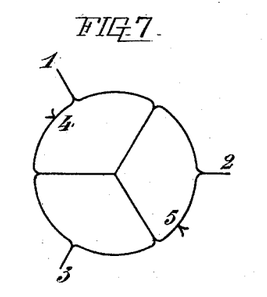

It should be observed that the points 4 and 5 moving over the lines 1 and 2, the latter may be formed of double parallel members, as shown in Fig. 6, without altering the problem or the conditions. Then again these connections may be opened out and expanded to the shape shown in Fig. 7, wherein we have again the ring form with external and internal Y connections. Now applying the contacts as shown at 4 and 5 in Fig. 7 obviously these may be connected by a properly-centered piece of apparatus, as in Fig. 3, and the resistance changed by symmetrical movements about the center.

Figure 8:
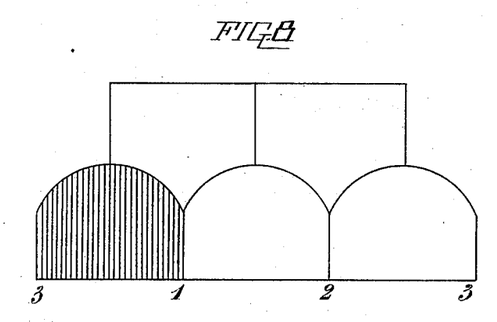

Fig. 8 shows a graphic development of the theoretically-defined cylinder having the three elements or resistances represented by the three curves and the three connected moving points, showing the symmetrical relations maintained.

Having thus described my invention, what I claim, and desire to secure by Letters Patent, is—

1. A power-factor-indicating apparatus for alternating-current circuits comprising a compounding-circuit, shunt connections to impress thereon an electromotive force having a determinate phase relation with the impressed electromotive force on the main circuit, series connections to impress thereon an electromotive force having a determinate phase relation with the current in the main circuit, means to determine the value of the resultant electromotive force in the compounding-circuit, and means to change the phase relations of the component electromotive forces in the compounding-circuit, whereby the resultant may be made a maximum or a minimum, together with mechanism to measure the angle of phase divergence, substantially as described.

2. A power-factor-indicating apparatus for alternating-current circuits comprising a compounding-circuit, shunt connections to impress thereon an electromotive force having a determinate phase relation with the impressed electromotive force on the main circuit, series connections to impress thereon an electromotive force having a determinate phase relation with the current in the main circuit, means to determine the value of the resultant electromotive force in the compounding-circuit, a phase-modifier adjustable to alter the phase relation of the component electromotive forces in the compounding-circuit, whereby their resultant may be raised or lowered in value, and means operable with the phase-modifier to indicate the angle of phase displacement, substantially as described.

3. A power-factor-indicating apparatus for alternating-current circuits comprising a local circuit connected on one side in shunt with the main circuit, and inductively connected on the other side with one of the mains, a potential-indicator and a phase-modifier in said local circuit, and a goniometer or angle-indicator operated by said phase-modifier, substantially as described.

4. A power-factor indicator for alternating-current circuits comprising a potential-indicator connected in shunt of the main circuit and also inductively in series therewith, a phase-modifier in circuit with and on one side of said potential-indicator, and means for determining a given angle of phase displacement, substantially as described.

5. In power-factor-indicating apparatus for alternating-current circuits, a voltmeter, a circuit therefor, means to impress on said circuit one electromotive force having a fixed phase relation with the initial electromotive force of the mains, and another electromotive force having a fixed phase relation with the current therein, a phase-modifier adapted to change the phase relations of the two electromotive forces, and an indicator to give the angle of such change, substantially as described.

6. A power-factor-indicating apparatus for alternating-current circuits comprising a local compounding-circuit, a source of electromotive force therefor in phase with the impressed electromotive force of the main circuit, a second source of electromotive force therefor in phase or in quadrature with the current in the said main circuit, an adjustable resistance adapted to equalize the potentials, a resultant-pressure indicator in the local circuit, and a phase-modifier therefor provided with means to measure its angles of phase displacement, substantially as described.

7. In a power-factor-indicating apparatus for alternating-current circuits, a local circuit with a voltmeter therein, a transformer connected on one side to said local circuit, with means to regulate the potential difference at its terminals, and on the other side across the main circuit, a second transformer having primary and secondary relatively adjustable, connected on one side with the local circuit and on the other side in series with the main circuit, means to displace the parts of the second transformer with regard to each other to dephase the secondary electromotive forces impressed on the local circuit, and an indicator to show the extent of such displacements, substantially as described.

In testimony whereof I have signed this specification in the presence of two subscribing witnesses.

ALEXANDRE GRAMMONT.

Witnesses:
JOSEPH LOUIS ROUTIN,
MARIN VACHORY.